United States Patent
Nguyen et al.

(10) Patent No.: US 12,056,497 B2
(45) Date of Patent: Aug. 6, 2024

(54) MULTI-SOCKET COMPUTING SYSTEM EMPLOYING A PARALLELIZED BOOT ARCHITECTURE WITH PARTIALLY CONCURRENT PROCESSOR BOOT-UP OPERATIONS, AND RELATED METHODS

(71) Applicant: Ampere Computing LLC, Santa Clara, CA (US)

(72) Inventors: Kha Hong Nguyen, Santa Clara, CA (US); Harb Ali Abdulhamid, Durham, NC (US); Phil Mitchell, San Jose, CA (US)

(73) Assignee: Ampere Computing LLC, Santa Clara, CA (US)

( * ) Notice: Subject to any disclaimer, the term of this patent is extended or adjusted under 35 U.S.C. 154(b) by 185 days.

(21) Appl. No.: 17/576,604

(22) Filed: Jan. 14, 2022

(65) Prior Publication Data
US 2022/0244966 A1    Aug. 4, 2022

Related U.S. Application Data

(60) Provisional application No. 63/145,241, filed on Feb. 3, 2021.

(51) Int. Cl.
*G06F 9/4401*    (2018.01)
(52) U.S. Cl.
CPC .................................. *G06F 9/4405* (2013.01)
(58) Field of Classification Search
CPC ...... G06F 9/4405; G06F 9/4403; G06F 9/445; G06F 11/3006
See application file for complete search history.

(56) References Cited

U.S. PATENT DOCUMENTS

| | | | |
|---|---|---|---|
| 2016/0004542 A1* | 1/2016 | Das | G06F 9/4405 713/2 |
| 2018/0101502 A1* | 4/2018 | Nassif | G06F 1/12 |
| 2019/0073478 A1* | 3/2019 | Khessib | G06F 13/4282 |
| 2020/0175169 A1* | 6/2020 | Pillilli | G06F 21/575 |
| 2020/0183872 A1* | 6/2020 | Srivastava | G06F 9/4403 |
| 2021/0349731 A1* | 11/2021 | Pillilli | G06F 9/4403 |

FOREIGN PATENT DOCUMENTS

| | | | | |
|---|---|---|---|---|
| CN | 110069363 B | * | 5/2023 | ............... G06F 1/30 |
| WO | WO-2022139828 A1 | * | 6/2022 | |

* cited by examiner

*Primary Examiner* — Jaweed A Abbaszadeh
*Assistant Examiner* — Hyun Soo Kim
(74) *Attorney, Agent, or Firm* — Withrow & Terranova, PLLC

(57) ABSTRACT

Multi-socket computing system employing a parallelized boot architecture with partially-concurrent processor boot-up operations. In a boot of the multi-socket computing system, a first, master CPU in a master CPU socket is configured to receive a master reset signal indicating a boot-up state. In response, the first, master CPU is configured to execute a first boot program code to perform a first CPU boot-up operation. To parallelize the boot operation of a second, slave CPU in a slave CPU socket, the execution of the first boot program code by the first, master CPU includes communicating a slave boot-up synchronization signal indicating the boot-up state to the second CPU to execute a second boot program code to perform a second CPU boot-up operation. The second CPU starts to perform its CPU boot-up operation partially concurrent with the performance of the CPU boot-up operation to reduce overall boot-up time.

25 Claims, 6 Drawing Sheets

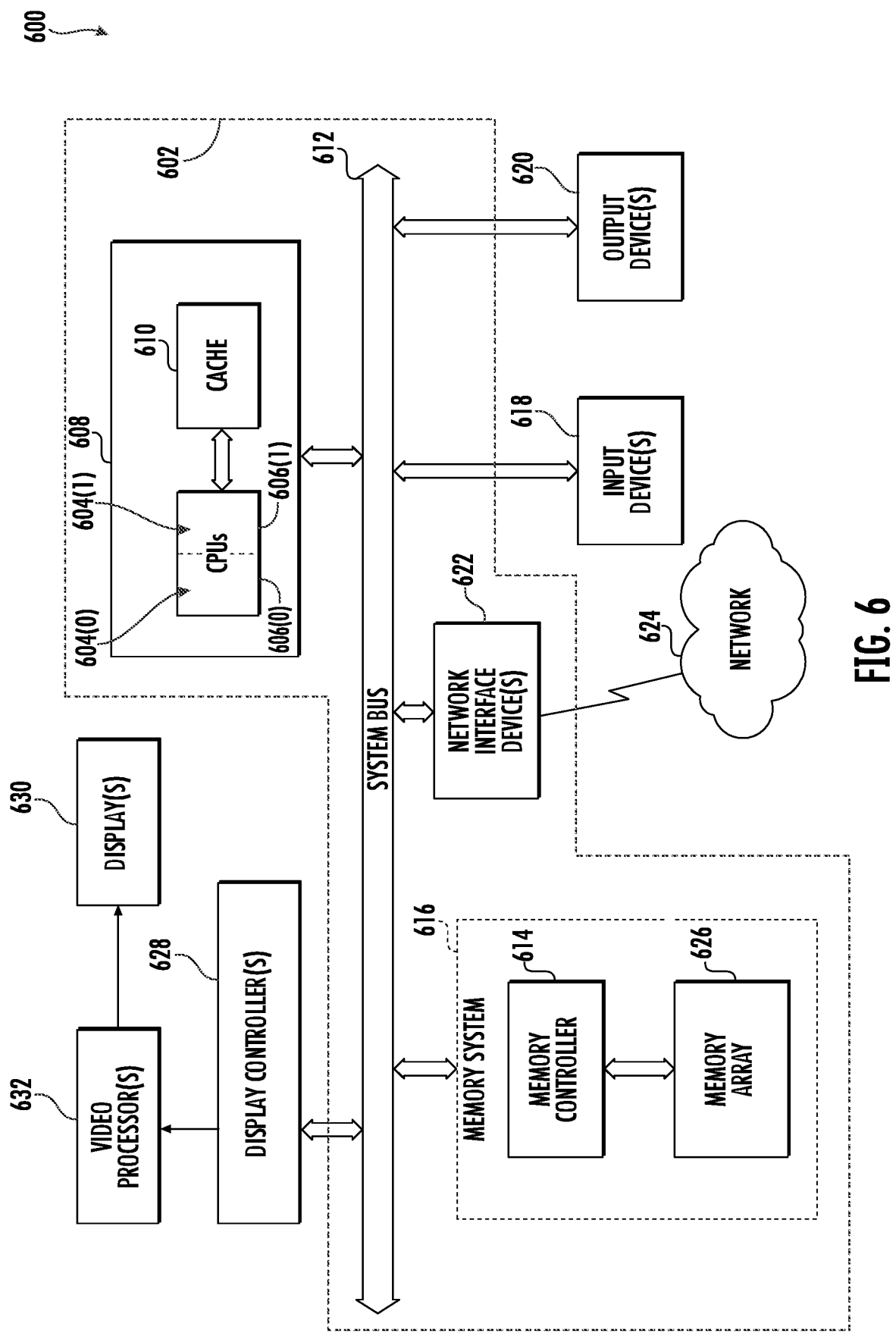

MULTI-SOCKET COMPUTING SYSTEM EMPLOYING A PARALLELIZED BOOT ARCHITECTURE WITH PARTIALLY CONCURRENT PROCESSOR BOOT-UP OPERATIONS, AND RELATED METHODS

PRIORITY APPLICATION

The present application claims priority under 35 U.S.C. § 119(e) to U.S. Provisional Patent Application Ser. No. 63/145,241, filed Feb. 3, 2021 and entitled "MULTI-SOCKET COMPUTING SYSTEM EMPLOYING A PARALLELIZED BOOT ARCHITECTURE WITH PARTIALLY CONCURRENT PROCESSOR BOOT-UP OPERATIONS, AND RELATED METHODS," the contents of which is incorporated herein by reference in its entirety.

FIELD OF THE DISCLOSURE

The technology of the disclosure relates to multi-socket central processing unit (CPU) socket ("multi-socket") computing systems employing multiple CPU sockets supporting respective CPUs, and more particularly to coordination of boot-up operations between multiple CPUs supported by the multiple CPU sockets.

BACKGROUND

Computing systems can include multiple central processing unit (CPU) sockets ("sockets") to allow for utilization of multiple processors in a computing system. This is conventionally referred to a "multi-socket" computing, or "multi-socket system." In a multi-socket computing system, each socket mechanically and electrical coupled to a circuit board, is coupled to a CPU integrated circuit (IC) chip ("CPU chip"). The CPU chip may also be a system-on-a-chip (SoC) where additional computing resources are located on the same chip as a CPU. The circuit board can also include shared computing resources, such as boot storage, memory, and interfacing circuits. Each socket, and in turn its supported CPU chip, can interface each CPU in the CPU chips to these shared resources through electrical interconnections in the socket providing electrical connections between the CPU chips and metal traces in the circuit board coupled to the shared computing resources.

The multi-socket computing system is booted to initiate the process of starting up the processing by the CPUs in the CPU chips. The CPUs of the multi-socket computing system can be booted by coupling or re-coupling power to CPU sockets. The CPUs of the multi-socket system can also support re-booting based on a reset signal applied to reset pin in the CPU chip that causes the CPUs to re-boot. Multi-socket computing systems may have unique challenges during boot. The CPUs could each be configured to perform boot processes according to a static boot process. However, it may be desired to boot the multiple CPUs in a serialized, synchronized manner for coordination and/or flexibility in initializing shared computing resources. For example, if a multi-socket computing system employs a heterogenous memory system whereby memory resources form a common memory system with a single memory map shared between the CPUs, certain memory discovery initialization processes may need to be performed in a synchronized manner between the CPUs. As another example, it may be desired for one CPU to authenticate another CPU in the multi-socket computing system for compatibility and/or security reasons in a boot of the multi-socket computing system. In this regard, the boot of the multi-socket computing system may need to rely on communication between the CPU sockets through a multi-socket communication link for the purpose of synchronization and coordination of shared computing resources, and exchange of information needed for each CPU to perform both local hardware and platform hardware initialization for the multi-socket computing system. However, it also desired to parallelize the booting of the multiple CPUs in a multi-socket computing system to minimize the overall boot time of the multi-socket computing system.

SUMMARY

Aspects disclosed herein include a multi-socket computing system employing a parallelized boot architecture with partially-concurrent processor boot-up operations. Related methods are also disclosed. In exemplary aspects, the multi-socket computing system includes multiple central processing unit (CPU) chip sockets ("sockets") each configured to support respective CPU chips. Each CPU chip includes a processor configured to perform certain boot-up operations in response to a boot of the multi-socket computing system. In exemplary aspects, in a boot of the multi-socket computing system, a first, master CPU in a master CPU socket is configured to receive a master reset signal indicating a boot-up state, such as in response to a power cycle for example. In response to the master reset signal indicating the boot-up state, the first, master CPU is configured to execute a first boot program code to perform a first CPU boot-up operation in the first, master CPU. The first CPU boot-up operation involves performing one or more CPU boot-up tasks to boot up and initialize the first, master CPU and/or shared computing resources coupled to the master CPU socket. To parallelize the boot operation of a second, slave CPU, the execution of the first boot program code by the first, master CPU also involves setting up a side band communication link coupled between the master CPU socket and the slave CPU socket. The first, master CPU is configured to communicate a slave boot-up synchronization signal indicating the boot-up state on the sideband communication channel from execution of the first boot program code. The second, slave CPU in the slave CPU socket is configured to, in response to the slave boot-up synchronization signal indicating the boot-up state, execute a second boot program code to perform a second CPU boot-up operation. The second CPU boot-up operation involves performing one or more CPU boot-up tasks to boot up and initialize the second, slave CPU and/or shared computing resources coupled to the slave CPU socket.

By the first CPU being configured to communicate the slave boot-up synchronization signal indicating the boot-up state on the sideband communication channel to the second CPU as part of the first CPU's boot-up operation, the second CPU can start to perform its CPU boot-up operation partially concurrent with the performance of the CPU boot-up operation performed by the first CPU. The second CPU can perform boot-up operations in a pipelined fashion with performance of the same or similar boot-up operations performed by the first CPU. In this manner, the first and second CPUs may complete their boot-up processes faster than would otherwise be accomplished by serializing and completing the boot-up operation of the first, master CPU before performing and completing the boot-up operation of the second, slave CPU. The boot-up operations of the CPUs of the multi-socket computing system can be performed partially concurrent to each other, because there are boot-up tasks that each CPU can perform independent of each other. However, for boot-up tasks that are multi-CPU dependent, the second, slave CPU can be configured to initiate these boot-up tasks based on release indicators from the first, master CPU. The boot-up time for first, master CPU may be slower due to the communication with the second, slave CPU to initiate boot-up operations in the second CPU than it otherwise would be without such communication. However, the overall boot-up time of the first and second CPUs may be faster overall due to the time savings in the concurrent parallelized boot operations in the first and second CPUs. Platform coordination off chip or board with the multi-socket computing system may also be avoided by the CPUs being able to perform their boot operations, mostly self-contained, in a parallelized manner.

In this regard, in one exemplary aspect, a multi-socket computing system is provided. The multi-socket computing system includes a CPU chip socket. The multi-socket computing system also includes a slave CPU chip socket. The multi-socket computing system also includes a first CPU chip disposed in the master CPU socket, the first CPU chip comprising a first CPU. The multi-socket computing system also includes a second CPU chip disposed in the slave CPU socket, the second CPU chip comprising a second CPU. The multi-socket computing system also includes a side band communication link coupled between the master CPU socket and the slave CPU socket. The first CPU is configured to receive a master reset signal indicating at boot-up state. In response to the master reset signal indicating the boot-up state, the first CPU is further configured to execute first boot program code to perform a first CPU boot-up operation to set up a sideband communication channel on the sideband communication link, communicate a slave boot-up synchronization signal indicating the boot-up state on the sideband communication channel, and perform a first CPU boot-up task. The second CPU is configured to, in response to the slave boot-up synchronization signal indicating the boot-up state, execute second boot program code to perform a second CPU boot-up operation comprising a second CPU boot-up task partially concurrent with the performance of the first CPU boot-up operation.

In another exemplary aspect, a method of performing partially concurrent processor boot operations in a multi-socket computing system is provided. The method includes receiving a master reset signal indicating at boot-up state in a first CPU in a first CPU chip disposed in a master CPU socket. In response to the master reset signal indicating the boot-up state, the method also includes executing first boot program code in the first CPU to perform a first CPU boot-up operation, comprising: setting up a sideband communication channel on the sideband communication link coupled between the master CPU socket and a slave CPU socket, communicating a slave boot-up synchronization signal indicating the boot-up state on the sideband communication channel, and performing a first CPU boot-up task. In response to the slave boot-up synchronization signal indicating the boot-up state in a second CPU in a second CPU chip disposed in the slave CPU socket, the method also includes executing a second boot program code in the second CPU to perform a second CPU boot-up operation comprising a second CPU boot-up task partially concurrent with the performance of the first CPU boot-up operation.

In another exemplary aspect, a non-transitory computer-readable medium is provided. The computer-readable medium has stored thereon computer executable instructions which, when executed by a processor, cause the processor to receive a master reset signal indicating at boot-up state in a first CPU in a first CPU chip disposed in a master CPU socket. The computer-readable medium also has stored thereon computer executable instructions which when executed by a processor, cause the processor to, in response to the master reset signal indicating the boot-up state, execute first boot program code in the first CPU to perform a first CPU boot-up operation to: set up a sideband communication channel on the sideband communication link coupled between the master CPU socket and a slave CPU socket, communicate a slave boot-up synchronization signal indicating the boot-up state on the sideband communication channel, and perform a first CPU boot-up task. The computer-readable medium also has stored thereon computer executable instructions which when executed by a processor, cause the processor to, in response to the slave boot-up synchronization signal indicating the boot-up state in a second CPU in a second CPU chip disposed in the slave CPU socket: execute a second boot program code in the second CPU to perform a second CPU boot-up operation comprising a second CPU boot-up task partially concurrent with the performance of the first CPU boot-up operation.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 is a block diagram of an exemplary processor-based system that can be socket computing system employing a parallelized boot architecture with partially concurrent central processing system (CPU) boot-up operations.

DETAILED DESCRIPTION

Figure 1:
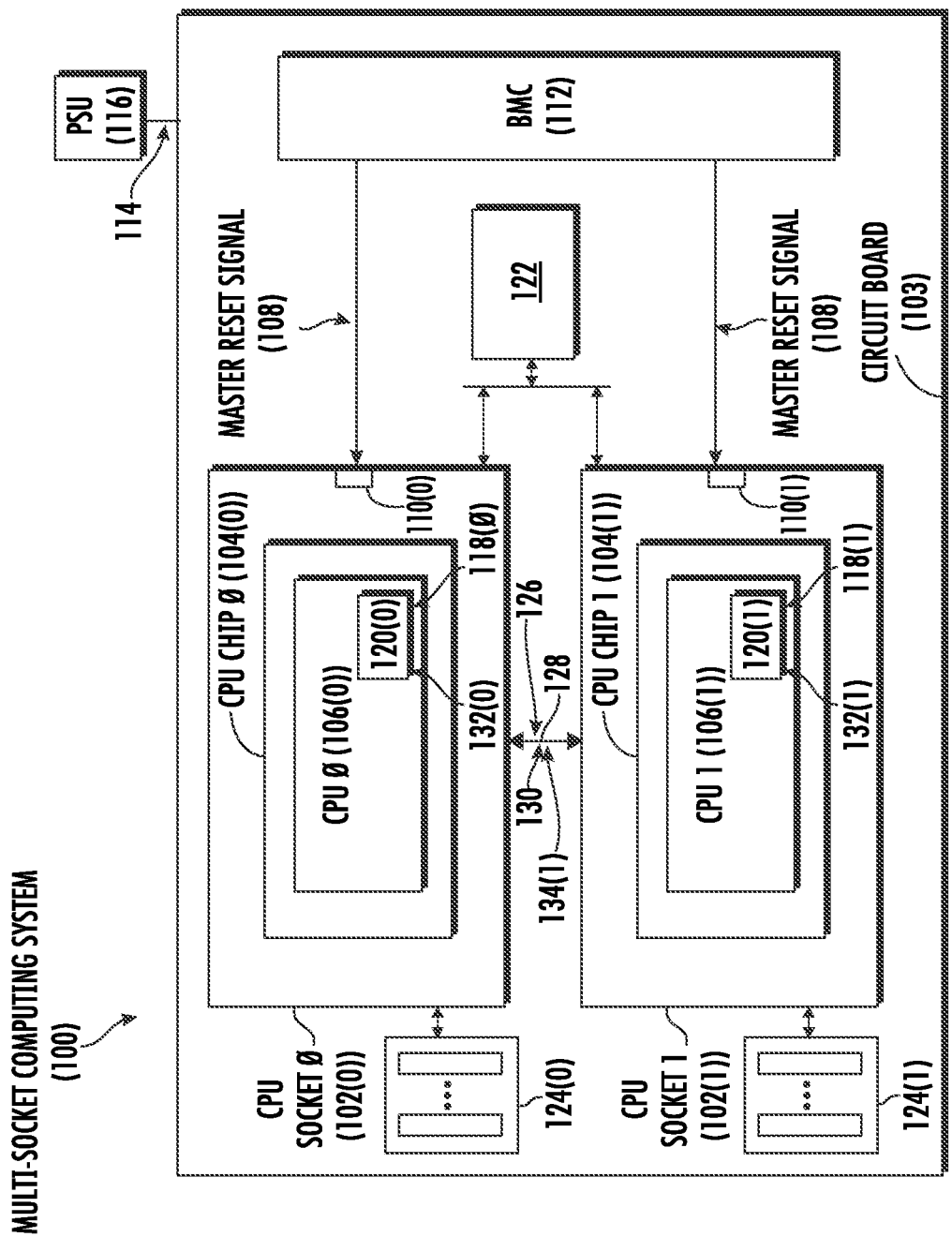
FIG. 1 is a block diagram of an exemplary multiple (multi-) socket ("multi-socket") computing system employing a parallelized boot architecture with partially concurrent central processing system (CPU) boot-up operations.

Exemplary aspects disclosed herein include a multi-socket computing system employing a parallelized boot architecture with partially-concurrent processor boot-up operations. Related methods are also disclosed. In exemplary aspects, the multi-socket computing system includes multiple central processing unit (CPU) chip sockets ("sockets") each configured to support respective CPU chips. Each CPU chip includes a processor configured to perform certain boot-up operations in response to a boot of the multi-socket computing system. In exemplary aspects, in a boot of the multi-socket computing system, a first, master CPU in a master CPU socket is configured to receive a master reset signal indicating a boot-up state, such as in response to a power cycle for example. In response to the master reset signal indicating the boot-up state, the first, master CPU is configured to execute a first boot program code to perform a first CPU boot-up operation in the first, master CPU. The first CPU boot-up operation involves performing one or more CPU boot-up tasks to boot up and initialize the first, master CPU and/or shared computing resources coupled to the master CPU socket. To parallelize the boot operation of a second, slave CPU, the execution of the first boot program code by the first, master CPU also involves setting up a side band communication link coupled between the master CPU socket and the slave CPU socket. The first, master CPU is configured to communicate a slave boot-up synchronization signal indicating the boot-up state on the sideband communication channel from execution of the first boot program code. The second, slave CPU in the slave CPU socket is configured to, in response to the slave boot-up synchronization signal indicating the boot-up state, execute a second boot program code to perform a second CPU boot-up operation. The second CPU boot-up operation involves performing one or more CPU boot-up tasks to boot up and initialize the second, slave CPU and/or shared computing resources coupled to the slave CPU socket.

By the first CPU being configured to communicate the slave boot-up synchronization signal indicating the boot-up state on the sideband communication channel to the second CPU as part of the first CPU's boot-up operation, the second CPU can start to perform its CPU boot-up operation partially concurrent with the performance of the CPU boot-up operation performed by the first CPU. The second CPU can perform boot-up operations in a pipelined fashion with performance of the same or similar boot-up operations performed by the first CPU. In this manner, the first and second CPUs may complete their boot-up processes faster than would otherwise be accomplished by serializing and completing the boot-up operation of the first, master CPU before performing and completing the boot-up operation of the second, slave CPU. The boot-up operations of the CPUs of the multi-socket computing system can be performed partially concurrent to each other, because there are boot-up tasks that each CPU can perform independent of each other. However, for boot-up tasks that are multi-CPU dependent, the second, slave CPU can be configured to initiate these boot-up tasks based on release indicators from the first, master CPU. The boot-up time for first, master CPU may be slower due to the communication with the second, slave CPU to initiate boot-up operations in the second CPU than it otherwise would be without such communication. However, the overall boot-up time of the first and second CPUs may be faster overall due to the time savings in the concurrent parallelized boot operations in the first and second CPUs. Platform coordination off chip or board with the multi-socket computing system may also be avoided by the CPUs being able to perform their boot operations, mostly self-contained, in a parallelized manner.

In this regard, FIG. 1 is a block diagram of an exemplary multiple (multi-) socket ("multi-socket") computing system 100 employing a parallelized boot architecture with partially concurrent central processing system (CPU) boot-up operations. In this example, the multi-socket computing system 100 includes two (2) central processing unit (CPU) chip sockets ("CPU sockets") 102(0), 102(1) (also labeled CPU SOCKET 0 and CPU SOCKET 1) that are mounted on a circuit board 103. The CPU sockets 102(1), 102(1) are each configured to support respective CPU chips 104(0), 104(1). Each CPU chip 104(0), 104(1) includes a respective CPU 106(0), 106(1) configured to perform certain boot-up operations in response to a boot of the multi-socket computing system 100. As discussed in more detail below, in a boot of the multi-socket computing system 100, the first CPU 106(0) in the CPU socket 102(0), acting as a master CPU, is configured to receive a master reset signal 108 on a respective master reset port 110(0), 110(1) indicating a boot-up state, such as in response to a power cycle for example. For example, a board management controller (BMC) 112 provided on the same circuit board 103 as the CPU sockets 102(0), 102(1) can be configured to generate the master reset signal 108 in response to detecting a power cycle of a power signal 114 from a power supply unit (PSU) 116. In response to the master reset signal 108 indicating the boot-up state, the first, master CPU 106(0) is configured to execute a boot program code 118(0) to perform a CPU boot-up operation in the first, master CPU 106(0). For example, the boot program code 118(0) may be stored in a memory 120(0) local to or within the CPU 106(0). The boot program code 118(0) may have been loaded by the CPU 106(0) into the memory 120(0) from an memory 122 external from the CPUs 106(0), 106(1), such as an EEPROM, as part of a CPU boot-up operation by the CPU 106(0). As discussed in more detail below, the first CPU boot-up operation involves the CPU 106(0) performing one or more CPU boot-up tasks as part of a CPU boot-up operation to boot up and initialize the CPU 106(0) and/or shared computing resources coupled to the master CPU socket 102(0). For example, such a shared computing resource may be an external memory 124(0) (e.g., double data rate (DDR) random access memory (RAM)) that can serve as part of an overall memory for the multi-socket computing system 100.

Booting the multi-socket computing system 100 also involves booting up the second, CPU 106(1) in the CPU socket 102(1), which can be thought of as a slave CPU. To parallelize the boot operation of the second, slave CPU 106(1), the execution of the boot program code 118(0) by the first, master CPU 106(0) also involves setting up a side band communication channel 126 on a side band communication link 128 between the master CPU socket 102(0) and the slave CPU socket 102(1). The first, master CPU 106(0) is configured to communicate a slave boot-up synchronization signal 130 indicating the boot-up state on the sideband communication channel 126 based on the CPUs 106(0) execution of the boot program code 118(0). In response to the slave boot-up synchronization signal 130 indicating the boot-up state being communicated to the second, slave CPU 106(1) in the slave CPU socket 102(1) over the sideband communication channel 126, the slave CPU 106(1) is configured execute a boot program code 118(1) to perform a CPU boot-up operation for the second, slave CPU 106(1). For example, the boot program code 118(1) may be stored in a memory 120(1) local to or within the CPU 106(1). The boot program code 118(1) may have been loaded by the CPU 106(1) into the memory 120(1) from the memory 122 as part of a CPU boot-up operation by the CPU 106(1). As discussed in more detail below, the first CPU boot-up operation involves the CPU 106(1) performing one or more CPU boot-up tasks as part of a CPU boot-up operation to boot up and initialize the CPU 106(1) and/or shared computing resources coupled to the slave CPU socket 102(2). For example, such a shared computing resource may be an external memory 124(1) (e.g., double data rate (DDR) random access memory (RAM)) that can serve as part of an overall memory for the multi-socket computing system 100.

As discussed in more detail below, by the first, master CPU 106(0) being configured to communicate the slave boot-up synchronization signal 130 indicating the boot-up state on the sideband communication channel 126 to the second, slave CPU 106(1) as part of the first CPU's 106(0) boot-up operation, the second, slave CPU 106(1) can start to perform its CPU boot-up operation partially concurrent with the performance of the CPU boot-up operation performed by the first CPU 106(0). Partially concurrent operation means in this example means that the second, slave CPU 106(1) performs CPU boot-up operations that partially overlap in time with the CPU boot-up operations performed by the first, master CPU 106(0). Partially concurrent operation does not require that the boot-up operations performed by one CPU 106(0), 106(1) are completed before the boot-up operations of the other CPU 106(1), 106(0) are completed, and vice versa. By providing for the second, slave CPU 106(1) to begin performing CPU boot-up operations in parallel with the first, master CPU 106(0), the second CPU 106(1) can perform boot-up operations in a pipelined fashion with the first CPU 106(0). The second CPU 106(1) can perform CPU boot-up operations in a parallel and/or pipelined fashion that are same or similar boot-up operations performed by the first CPU 106(0) as an example.

In this manner, the first and second CPUs 106(0), 106(1) may complete their boot-up processes faster than would otherwise be accomplished by serializing and completing the boot-up operation of the first, master CPU 106(0) fully before performing and completing the boot-up operation of the second, slave CPU 106(1). The boot-up operations of the CPUs 106(0), 106(1) of the multi-socket computing system 100 can be performed partially concurrent to each other, because there may be boot-up tasks that each CPU 106(0), 106(1) can perform independent of each other. However, for boot-up tasks that are multi-CPU dependent (e.g., the second CPU 106(1) is dependent on an action from the first CPU 106(0)), the second, slave CPU 106(1) can be configured to initiate these boot-up tasks based on release indicators from the first, master CPU 106(0). The boot-up time for first, master CPU 106(0) in the multi-socket computing system 100 in FIG. 1 may be slower due to the communication with the second, slave CPU 106(1) to initiate boot-up operations in the second CPU 106(1) than it otherwise would be without such communication. However, the overall boot-up time of the first and second CPUs 106(0), 106(1) may be faster overall due to the time savings in the concurrent parallelized boot operations in the first and second CPUs 106(0), 106(1). Platform coordination off chip or board with the multi-socket computing system 100 may also be avoided by the CPUs 106(0), 106(1) being able to perform their boot operations, mostly self-contained, in a parallelized manner.

Note that the concepts and partially concurrent CPU boot-up operations described above for the multi-socket computing system 100 in FIG. 1 is not limited to two (2) CPUs. The concepts and features described above can apply to multi-socket computing systems that include more than two (2) CPUs. For example, a multi-socket computing system that is configured to perform partially concurrent CPU boot-up operations could include a master CPU and two (2) or more slave CPUs each disposed in their own respective CPU sockets.

Figure 2:
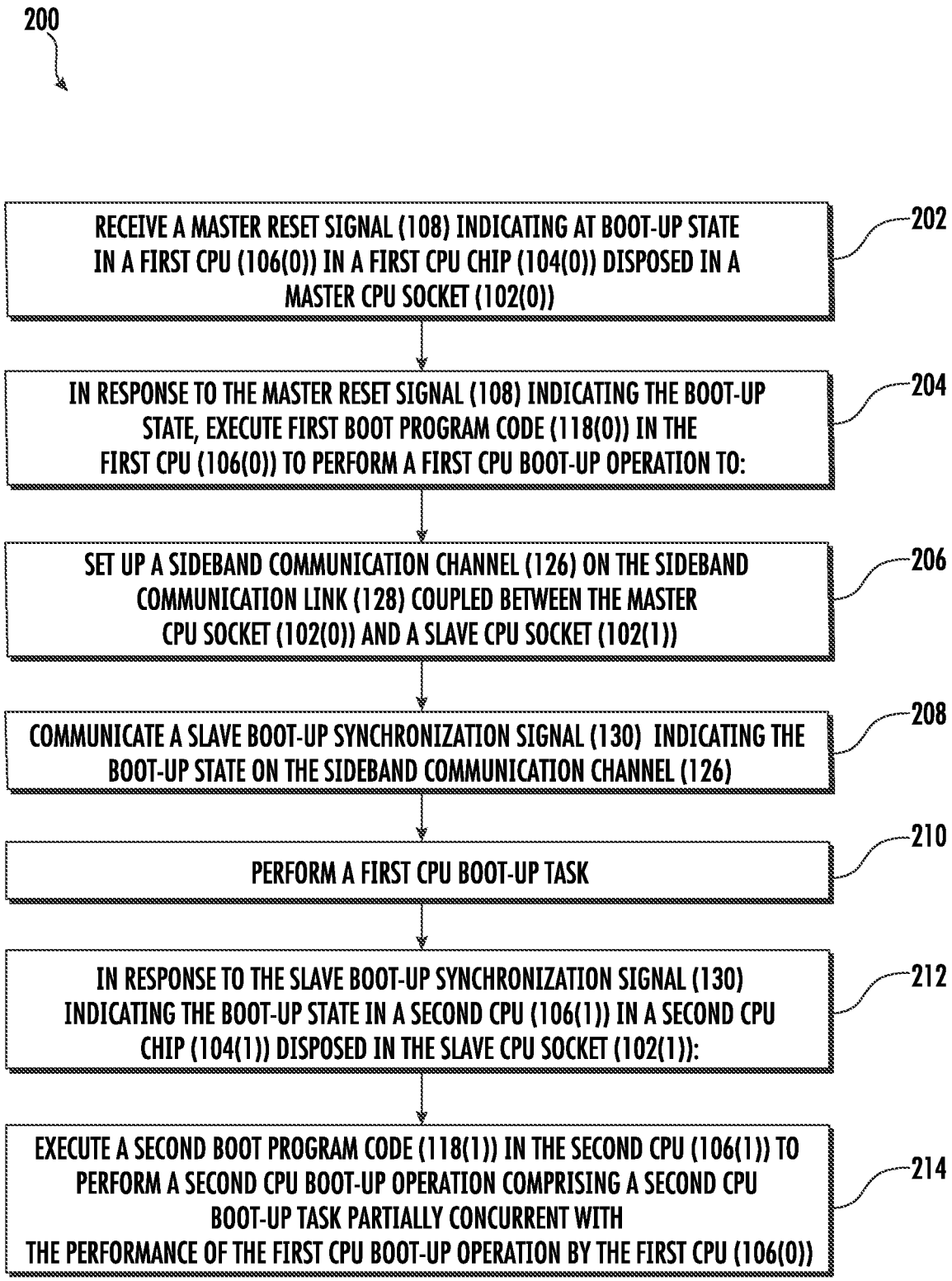
FIG. 2 is a flowchart illustrating a boot-up operation process in the multi-socket computing system in FIG. 1 to achieve partially concurrent CPU boot-up operations between a first CPU in a master CPU socket and a second CPU in a slave CPU socket.

FIG. 2 is a flowchart illustrating a boot-up operation process 200 in the multi-socket computing system 100 in FIG. 1 to achieve partially concurrent CPU boot-up operations between the first, master CPU 106(0) in the master CPU socket 102(0) and the second CPU 106(1) in the slave CPU socket 102(1). The boot-up operation process 200 200 in FIG. 2 is discussed in reference to the multi-socket computing system 100 in FIG. 1.

In this regard, with reference to FIGS. 1 and 2, the boot-up operation process 200 includes receiving a master reset signal 108 indicating at boot-up state in a first CPU 106(0) in a first CPU chip 104(0) disposed in a master CPU socket 102(0) (block 202 in FIG. 2). In response to the master reset signal 108 indicating the boot-up state, the first CPU 106(0) executes first boot program code 118(0) in the first CPU 106(0) to perform a first CPU boot-up operation (block 204 in FIG. 2). The first CPU boot-up operation performed by the first CPU 106(0) includes setting up a sideband communication channel 126 on the sideband communication link 128 coupled between the master CPU socket 102(0) and a slave CPU socket 102(1) (block 206 in FIG. 2). The first CPU boot-up operation performed by the first CPU 106(0) also includes the first CPU 106(0) communicating a slave boot-up synchronization signal 130 indicating the boot-up state on the sideband communication channel 126 (block 208 in FIG. 2). The first CPU boot-up operation performed by the first CPU 106(0) also includes the first CPU 106(0) performing a first CPU boot-up task (block 210 in FIG. 2). In response to the slave boot-up synchronization signal 130 indicating the boot-up state in a second CPU 106(1) in a second CPU chip 104(1) disposed in the slave CPU socket 102(1) (block 212 in FIG. 2), the second CPU 106(1) is configured to execute a second boot program code 118(1) in the second CPU 106(1) to perform a second CPU boot-up operation (block 214 in FIG. 2). The second CPU boot-up operation performed by the second CPU 106(1) includes the second CPU 106(1) performing a second CPU boot-up task partially concurrent with the performance of the first CPU boot-up operation by the first CPU 106(0) (block 216 in FIG. 2).

With continued reference to the multi-socket computing system 100 in FIG. 1, in this example, the CPUs 106(0), 106(1) access the same boot program code 118 from the memory 122 to be executed to perform their respective CPU boot-up operations. In this example, the CPUs 106(0), 106(1) have a lower-level bootloader program code 132(0), 132(1) in firmware, that may be stored in local memory 120(0), 120(1). The CPU 106(0), 106(1) are configured to execute their lower-level bootloader program code 132(0), 132(1) in a boot of the multi-socket computing system 100 upon receipt of the master reset signal 108 indicating the boot-up state. The CPUs 106(0), 106(1) may be configured to start execution of their respective lower-level bootloader program code 132(0), 132(1) at their respective reset vectors in response to the master reset signal 108. The master CPU 106(0) execution of the lower-level bootloader program code 132(0) cause the boot program code 118 to be loaded from memory 122 into the local memory 120(0) for the CPU 106(0). The CPU 106(0) can then continue performing boot-up operations and tasks based on execution of the loaded boot program code 118(0). For example, execution of the loaded boot program code 118(0) may cause the master CPU 106(0) to setup the sideband communication channel 126 for communicating to the slave CPU 106(1). The master CPU 106(0) is configured to communicate the slave boot-up synchronization signal 130 to the slave CPU 106(1) as part of the process when executing the loaded boot program code 118(0). Thus, the loading of the boot program code 118(0) by the master CPU 106(0) by execution of the lower-level bootloader program code 132(0) is completed before the boot program code 118(0) can be executed to then communicate the slave boot-up synchronization signal 130 to the slave CPU 106(1).

The slave CPU 106(1) receives the master reset signal 108 contemporaneously with the master CPU's 106(0) receipt, which in this example also causes the slave CPU 106(1) to execute its lower-level bootloader program code 132(1). However, in this example, execution of the lower-level bootloader program code 132(1) causes the slave CPU 106(1) to wait until the slave boot-up synchronization signal 130 from the master CPU 106(0) is received indicating the boot-up state to load in its respective boot program code 118(1) from the memory 122 in a serialized manner. This avoids contention between the master and slave CPUs 106(0), 106(1) trying to load the boot program code 118 from memory 122 at the same time. One of the advantages of the sideband communication channel 126 is that it enables coordination by the CPUs 106(0), 106(1) of shared resources, such external memory 122, so that the CPUs 106(0), 106(1) are not accessing the shared resource in a contentious manner. The slave boot-up synchronization signal 130 acts as a release indicator to release the slave CPU 106(1) to continue performing its CPU boot-up operation. But by the master CPU 106(0) communicating the slave boot-up synchronization signal 130 to the slave CPU 106(1) as part of its CPU boot-up operation, this frees the slave CPU 106(1) to then load in its respective boot program code 118(1) from the memory 122 into its local memory 120(0) to then also execute its CPU boot-up operation partially concurrently with the master CPU's 106(0) performance of its CPU boot-up operation.

The CPU boot-up operations performed by the master and slave CPUs 106(0), 106(1) can involve a variety of different boot-up tasks depending on the needs and design of the multi-socket computing system 100. For example, one CPU boot-up task that may be performed by the master CPU 106(0) executing the boot program code 118(0) as part of the boot-up process is to verify the slave CPU 106(1) installed in the slave CPU socket 102(1) for security purposes. This may be desired to ensure that the multi-socket computing system 100 can identify if an unauthorized CPU is installed in the CPU socket 102(1). Also, because the master CPU 106(0) in this example is responsible to communicate the slave boot-up synchronization signal 130 to the slave CPU 106(1), if the master CPU 106(0) is unauthorized or has otherwise been tampered with or replaced, the slave CPU 106(1) can be configured to not continue the boot-up process if the verification process is not performed or as expected from the master CPU 106(0) through the sideband communication channel 126 or other channel setup on the sideband communication link 128.

In this regard, in response to the receipt of the slave boot-up synchronization signal 130, the slave CPU 106(1) can be configured to communicate a CPU identification 134(1) to the master CPU 106(0) over the sideband communication channel 126 as part of the CPU boot-up operation performed by the slave CPU 106(1). The CPU boot-up operation performed by the master CPU 106(0) involves waiting for receipt of the CPU identification 134(1). The master CPU 106(0) can determine through execution of processes according to the boot program code 118(0) if the CPU identification 134(1) indicates a valid slave CPU 106(1). If the slave CPU 106(1) is determined to be valid, the master CPU 106(0) can continue with its CPU boot-up operation normally. The slave CPU 106(1) can also continue with its CPU boot-up operation normally. The slave CPU 106(1) may be configured to receive a handshake acknowledgement over the sideband communication channel 126 to continue with its CPU boot-up operation as well, such that the slave CPU 106(1) will continue to perform its CPU boot-up operation partially concurrently with the master CPU 106(0) continuing to perform its CPU boot-up operation.

If however, the slave CPU 106(1) is determined to not be valid by the master CPU 106(0), the master CPU 106(0) may be configured to continue with its CPU boot-up operation in a standalone mode. The master CPU 106(0) may also be configured in this case to continue in a standalone operation mode where the CPU in the slave CPU socket 106(1) is ignored. The master CPU 106(0) can be configured to not provide the handshake acknowledgement over the sideband communication channel 126 to the slave CPU 106(1) such that the slave CPU 106(1) continues with its CPU boot-up operation as well. Even if the slave CPU 106(0) is configured to ignore this handshake acknowledgement, the master CPU 106(0) can be configured to operate in a standalone mode without relying on the resources of the CPU in the slave CPU socket 106(1). Alternatively, if the slave CPU 106(1) is determined to not be valid by the master CPU 106(0), the master CPU 106(0) can be configured to stop the CPU boot-up operation and shutdown or reset itself, as examples. The master CPU 106(0) can also be configured to wait a predetermined authentication time for the slave CPU 106(1) to provide its CPU identification 134(1) before designating the slave CPU 106(1) is not valid.

Other CPU boot-up tasks that can be performed by the CPUs 106(0), 106(1) can include the initialization of shared computing sources, such as the external memory 124(0), 124(1) connected to the respective CPU sockets 102(0), 102(1). For example, execution of the boot program code 118(0) can be designed to cause the master CPU 102(0) to verify, initialize, and/or test the external memory 124(0) connected to its respective CPU socket 102(0). Execution of the boot program code 118(1) can also be designed to cause the slave CPU 102(1) to verify, initialize, and/or test the external memory 124(1) connected to its respective CPU socket 102(1). The slave CPU 106(1) may be configured to report the verified and initialized external memory 124(1) connected to its CPU socket 102(1), and vice versa, so that each CPU 106(0), 106(1) can use this information to form a global memory map for the entire multi-socket computing system 100 to utilize the external memories 124(0), 124(1) as a global memory space.

Another example of a CPU boot-up tasks that can be performed by the CPUs 106(0), 106(1) can include the initialization of clock circuits, including phase-locked loop (PLL) circuits that control the frequencies of generated clock signals. Another example of a CPU boot-up tasks that can be performed by the CPUs 106(0), 106(1) can include the initialization of local power rails, operating voltage levels, clock signals, and signal interfaces, such as PCIe lanes and related devices.

Figure 3:
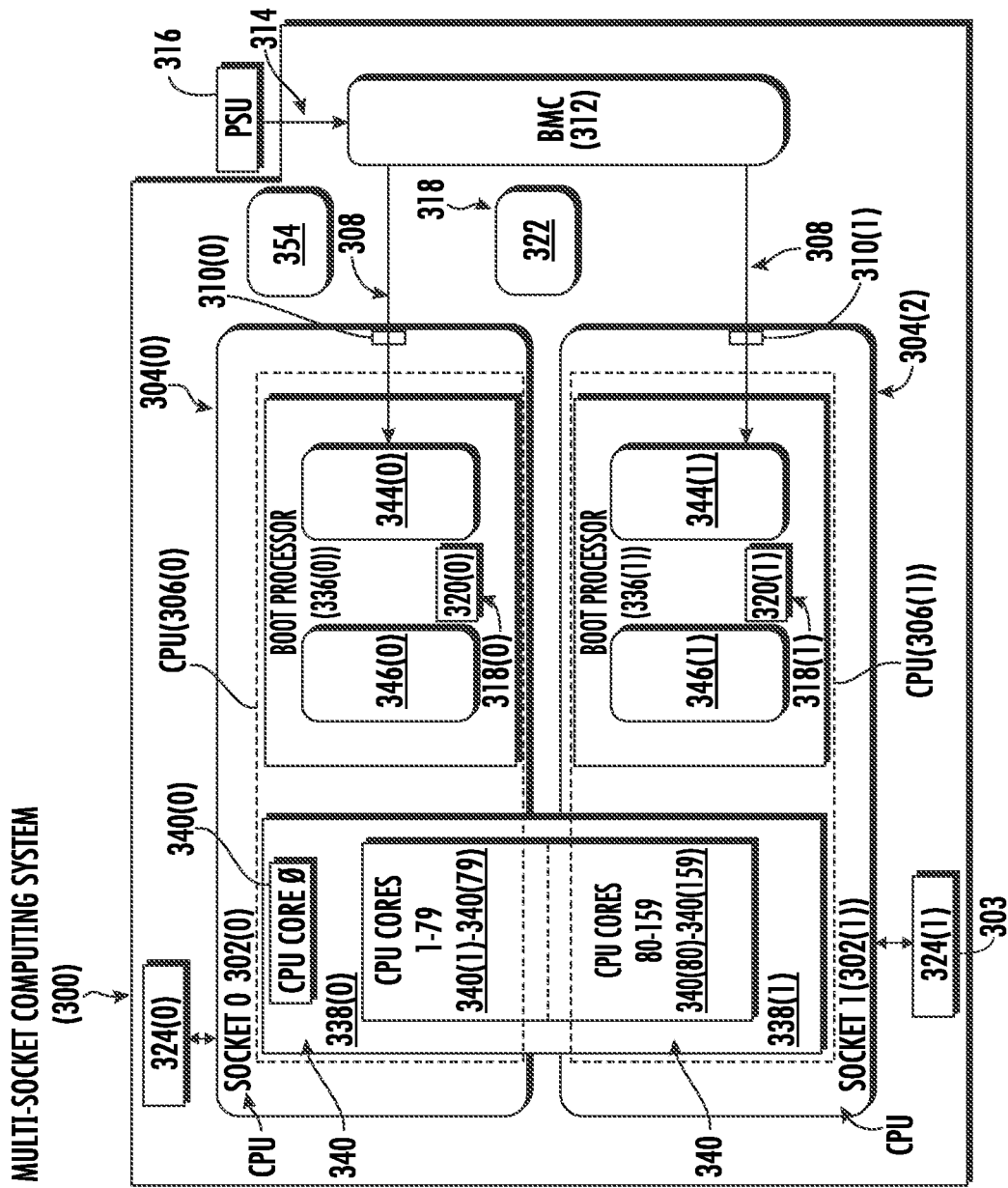
FIG. 3 is a block diagram of another exemplary multi-socket computing system employing a parallelized boot architecture with partially concurrent central processing system (CPU) boot-up operations.

FIG. 3 is a block diagram of another exemplary multi-socket computing system 300 employing a parallelized boot architecture with partially concurrent central processing system (CPU) boot-up operations. In this example, the multi-socket computing system 300 includes two (2) central processing unit (CPU) chip sockets ("CPU sockets") 302(0), 302(1) (also labeled CPU SOCKET 0 and CPU SOCKET 1) that are mounted on a circuit board 303. The CPU sockets 302(1), 302(1) are each configured to support respective CPU chips 304(0), 304(1). Each CPU chip 304(0), 304(1) includes a respective CPU 306(0), 306(1) configured to perform certain boot-up operations in response to a boot of the multi-socket computing system 300. The CPU 306(0) acts as a master CPU, and the CPU 306(1) acts as a slave CPU. The master CPU 306(0) includes a boot processor 336(0) and an application processor 338(0). The slave CPU 306(1) includes a boot processor 336(1) and an application processor 338(1). As will be discussed in more detail below, the boot processors 336(0), 336(1) are responsible for performing lower-level, hardware boot-up operations by executing boot program code 318 loaded from a memory 322 (e.g., an EEPROM) in response to a reset or power cycle of the multi-socket computing system 300. These are referred to as "hardware" boot-up operations, examples of which are described in more detail below. As will also be discussed in more detail below, the application processors 338(0), 338(1) include respective CPU cores 340 that are configured to execute program code to execute higher lever applications for the multi-socket computing system 300. In this example, the application processor 338(0) of the master CPU 306(0) includes eighty (80) CPU cores 340(0)-340(79). The application processor 338(1) of the slave CPU 306(1) includes eighty (80) CPU cores 340(80)-340(159). As discussed in more detail below, the application processors 338(0), 338(1) can invoke a designed number of their respective CPU cores 340(0)-340(79), 340(80)-340(159) to perform application boot-up operations for the multi-socket computing system 300. This is because the boot up process for multi-socket computing system 300 may include boot-up tasks that are suited in particular to be performed by the application processors 338(0), 338(1) and not the boot processors 336(0), 336(1). However, as discussed below, the boot processors 336(0), 336(1) perform hardware boot-up operations first to initialize certain resources that may be necessary to be booted in order for the application processors 338(0), 338(1) can then perform application boot-up and then application processes. For example, one of the hardware boot-up operations may be to boot-up and initialize system memory that can then be used by the application processors 338(0), 338(1). As another example, another of the hardware boot-up tasks performed by the boot processor 336(0) in the master CPU 306(0) may be to load BIOS software into a CPU core, such as CPU core 340(0) to then load in an operating system to be executed to service execution of the other CPU cores 340(1)-340(159) across both CPUs 306(0), 306(1). System memory 324(0), 324(1) is coupled to the respective CPU sockets 302(0), 302(1) that can be provide a shared computing resource (e.g., double data rate (DDR) random access memory (RAM)) that can serve as part of an overall memory for the multi-socket computing system 300.

With continuing reference to FIG. 3, the boot processors 336(0), 336(1) in the respective master and slave CPUs 306(0), 306(1) include multiple components that share responsibility to perform certain hardware boot-up operations in this example. In this example, the boot processors 336(0), 336(1) include respective security and management controllers 344(0), 344(1) that are configure to perform hardware boot-up tasks upon coming out of a reset as indicated by the master reset signal 308 indicating a boot-up state. The boot processors 336(0), 336(1) also include respective power management controllers 346(0), 346(1) that are configured to perform power management initialization boot-up operations in the hardware boot-up process after the security and management controllers 344(0), 344(1) perform initial hardware boot-up tasks. The security and management controllers 344(0), 344(1) and power management controllers 346(0), 346(1) may be micro-controllers. Providing the separate security and management controllers 344(0), 344(1) and power management controllers 346(0), 346(1) in the respective boot processors 336(0), 336(1) allows the master CPU 306(0) and the slave CPU 306(1) to perform hardware boot-up operations in parallel and partially concurrent with other and in turn initiate application boot-up operations to be performed in their respective application processors 338(0), 338(1).

Figure 4:
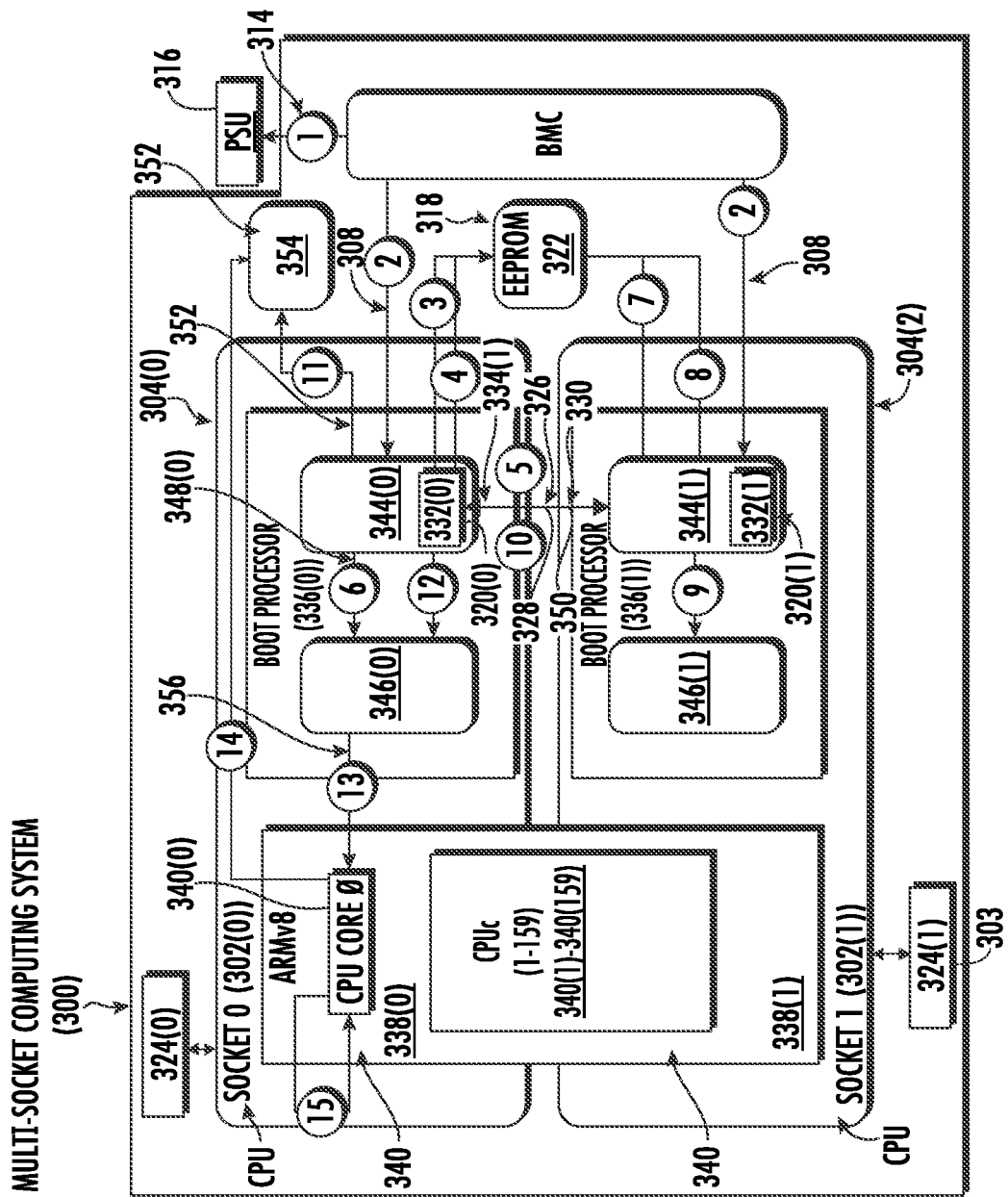
FIG. 4 is a block diagram of an exemplary boot-up operation process in the multi-socket computing system in FIG. 3 to achieve partially concurrent CPU boot-up operations between a first CPU in a master CPU socket and a second CPU in a slave CPU socket.

To illustrate an exemplary boot-up operation process flow in the multi-socket computing system 300 in FIG. 3, FIG. 4 is provided. FIG. 4 is a block diagram that illustrates an exemplary boot-up operation process flow for the multi-socket computing system 300 in FIG. 3 to perform partially concurrent boot-up operations between the first, master CPU 306(0) in the master CPU socket 302(0) and the second, slave CPU 306(1) in the slave CPU socket 302(1). The discussion of processes for the exemplary boot-up operation process in the multi-socket computing system 300 are shown in numbered circles 1-15 in FIG. 4, which are referenced below In this regard, as illustrated in FIG. 4, the BMC 312 is configured to receive a power signal 314 from a PSU 316 indicating a reset or power cycle of the multi-socket computing system 300 (number 1). In response, the BMC 312 is configured to generate the master reset signal 308 to the reset ports 310(0), 310(1) of the CPUs 306(0), 306(1) in the respective CPU sockets 302(0), 302(1) indicating a boot-up state (number 2). The security and management controller 344(0) of the boot processor 336(0) of the CPU 302(0) receives the master reset signal 308. In response, the security and management controller 344(0) is configured to execute a lower-level bootloader program code 332(0) that may be stored in local memory 320(0). The CPU 106(0), 106(1) are configured to execute their lower-level bootloader program code 132(0), 132(1) in a boot of the multi-socket computing system 100 upon receipt of the master reset signal 108 indicating the boot-up state. The security and management controller 344(0) starts execution of the lower-level bootloader program code 332(0) starting at its reset vector in response to the master reset signal 108. The security and management processor's 344(0) execution of the lower-level bootloader program code 332(0) cause the boot program code 318 to be loaded from memory 322 into the local memory 320(0) for the CPU 306(0) (numbers 3 and 4). The boot program code 318(0) may include boot program code for the security and management controller 344(0) and the power management controller 346(0).

The security and management controller 344(1) of the boot processor 336(1) of the slave CPU 306(1) receives the master reset signal 308 contemporaneously with the master CPU's 306(0) receipt. This causes slave CPU 306(1) to execute its lower-level bootloader program code 332(1) to initiate the hardware boot-up operations in the CPU 306(1). However, in this example, execution of the lower-level bootloader program code 332(1) causes the slave CPU 306(1) to wait until a slave boot-up synchronization signal 330 from the master CPU 306(0) is received indicating the boot-up state (number 5). In parallel, the security and management controller 344(0) of the boot processor 336(0) of the master CPU 306(0) issues a release reset signal 348(0) to the power management controller 346(0) to continue performing hardware boot-up tasks including a power management boot-up tasks for the CPU 306(0) (number 6).

Concurrently, in response to receipt of the slave boot-up synchronization signal 330, the security and management controller 344(1) of the boot processor 336(1) of the slave CPU 306(1) loads in its respective boot program code 318(1) from the memory 322 in a serialized manner (numbers 7 and 8). The security and management controller 344(1) waits to load the boot program code 318(1) from the memory 322 until the slave boot-up synchronization signal 330 is received, which avoids contention between the master and slave CPUs 306(0), 306(1) trying to load the boot program code 118 from memory 122 at the same time. One of the advantages of the sideband communication channel 126 is that it enables coordination by the CPUs 306(0), 306(1) of shared resources, such external memory 322, so that the CPUs 306(0), 306(1) are not accessing the shared resource in a contentious manner. The slave boot-up synchronization signal 330 acts a release indicator to release the slave CPU 306(1) to continue performing its hardware boot-up operation. But by the master CPU 306(0) communicating the slave boot-up synchronization signal 330 to the slave CPU 306(1) as part of its hardware boot-up operation, this frees the slave CPU 306(1) to then load in its respective boot program code 318(1) from the memory 122 into its local memory 320(1) to then also execute its hardware boot-up operation partially concurrently with the master CPU's 306(0) performance of its hardware boot-up operation. The boot program code 318(1) may include boot program code for the security and management controller 344(1) and the power management controller 346(1).

The hardware boot-up operations performed by the master CPU 306(0), can involve verifying the slave CPU 306(1) installed in the slave CPU socket 302(1) for security purposes. This may be desired to ensure that the multi-socket computing system 300 can identify if an unauthorized CPU is installed in the CPU socket 302(1). Also, because the master CPU 306(0) in this example is responsible to communicate the slave boot-up synchronization signal 330 to the slave CPU 306(1), if the master CPU 306(0) is unauthorized or has otherwise been tampered with or replaced, the slave CPU 306(1) can be configured to not continue the boot-up process if the verification process is not performed or as expected from the master CPU 306(0) through the sideband communication channel 326 or other channel setup on the sideband communication link 328.

In this regard, in response to the receipt of the slave boot-up synchronization signal 330, the slave CPU 306(1) can be configured to communicate a CPU identification 334(1) to the master CPU 306(0) over the sideband communication channel 326 as part of the hardware boot-up operation performed by the slave CPU 306(1). The hardware boot-up operation performed by the master CPU 306(0) involves waiting for receipt of the CPU identification 334 (1). The master CPU 306(0) can determine through execution of processes according to the boot program code 318(0) if the CPU identification 134(1) indicates a valid slave CPU 306(1). If the slave CPU 306(1) is determined to be valid, the master CPU 306(0) can continue with its hardware boot-up operation normally. The slave CPU 306(1) can also continue with its hardware boot-up operation normally. The slave CPU 306(1) may be configured to receive a handshake acknowledgement over the sideband communication channel 326 to continue with its CPU boot-up operation as well, such that the slave CPU 306(1) will continue to perform its CPU boot-up operation partially concurrently with the master CPU 306(0) continuing to perform its CPU boot-up operation.

If however, the slave CPU 306(1) is determined to not be valid by the master CPU 306(0), the master CPU 306(0) may be configured to continue with its CPU boot-up operation in a standalone mode. The master CPU 306(0) may also be configured in this case to continue in a standalone operation mode where the CPU in the slave CPU socket 306(0) is ignored. The master CPU 306(0) can be configured to not provide the handshake acknowledgement over the sideband communication channel 126 to the slave CPU 306(1) such that the slave CPU 306(1) continues with its CPU boot-up operation as well. Even if the slave CPU 306(1) is configured to ignore this handshake acknowledgement, the master CPU 306(0) can be configured to operate in a standalone mode without relying on the resources of the CPU in the slave CPU socket 306(1). Alternatively, if the slave CPU 306(1) is determined to not be valid by the master CPU 306(0), the master CPU 306(0) can be configured to stop the CPU boot-up operation and shutdown or reset itself, as examples. The master CPU 306(0) can also be configured to wait a predetermined authentication time for the slave CPU 306(1) to provide its CPU identification 334(1) before designating the slave CPU 306(1) is not valid.

With continuing reference to FIG. 4, the security and management controller 344(1) of the boot processor 336(1) of the master CPU 306(1) issues a release reset signal 348(1) to the power management controller 346(01) to continue performing hardware boot-up tasks including a power management boot-up tasks for the CPU 306(1) (number 9). The master and slave CPUs 306(0), 306(1) may continue to communicate to continue coordination of boot-up operations. To speed up this communication, the security and management controller 344(0) of the boot processor 336(0) of the master CPU 306(0) may setup a high speed sideband communication channel 350 over the sideband communication link 328 between the CPU 306(0), 306(1) (number 10).

The CPU 106(0) can then continue performing boot-up operations and tasks based on execution of the loaded boot program code 118(0). For example, execution of the loaded boot program code 118(0) may cause the master CPU 106(0) to setup the sideband communication channel 126 for communicating to the slave CPU 106(1). The master CPU 106(0) is configured to communicate the slave boot-up synchronization signal 130 to the slave CPU 106(1) as part of the process when executing the loaded boot program code 118(0). Thus, the loading of the boot program code 118(0) by the master CPU 106(0) by execution of the lower-level bootloader program code 132(0) is completed before the boot program code 118(0) can be executed to then communicate the slave boot-up synchronization signal 130 to the slave CPU 106(1).

With continuing reference to FIG. 4, the application processors 338(0), 338(1) of the master and slave CPUs 306(0), 306(1) also need to perform an application boot-up operation. However, in this example, the application processors 338(0), 338(1) need respective application program code to perform application boot-up tasks and to be able to execute applications thereafter. For example, it may be necessary to load an operation system image into a CPU core 340, such as CPU core 340(0), to be executed to perform application boot-up tasks and to be able to support and manage the other CPU cores 340(1)-340(159) executing program code for applications. In this regard, the security and management controller 344(0) is configured to load an application image 352 of application program code form a memory 354 that stores the application image, such as a flash memory (number 11). The flash memory can be erased and reprogrammed to update the application image over time, as desired. The security and management controller 344(0) then provides the loaded application image 352 through the power management controller 346(0) to the to the CPU core 340(0) in the CPU (0) (number 12). The power management controller 346(0) issues a release signal 356 to cause the CPU core 340(0) to initiate an application boot-up operation through execution of the loaded application image 352 (number 13). Other application program codes that can be used for other application boot-up tasks, such as to initialize interfaces and memory, such as the system memories 324(0), 324(1) can also be loaded by the CPU core 304(0) from memory 354 (number 14). The CPU core 340(0) is configured to execute the program code in the loaded application image 352 to boot-up an operating system to support and manage the other CPU cores 340(1)-340 (159) executing program code for applications in the multi-socket computing system 300.

Other hardware boot-up tasks that can be performed by the CPUs 306(0), 306(1) can include the initialization of shared computing sources, such as the system memory 324(0), 324(1) connected to the respective CPU sockets 302(0), 302(1). For example, a hardware boot-up tasks that can be performed by the CPUs 306(0), 306(1) can include the initialization of clock circuits, including phase-locked loop (PLL) circuits that control the frequencies of generated clock signals. Another example of a hardware boot-up tasks that can be performed by the CPUs 306(0), 306(1) can include the initialization of local power rails, operating voltage levels, clock signals, and signal interfaces, such as PCIe lanes and related devices. An example of another CPU application boot-up tasks that can be performed by the CPUs 306(0), 306(1) can include the initialization of shared computing sources, such as the system memory 324(0), 324(1) connected to the respective CPU sockets 302(0), 302(1). As another example, execution of the boot program code 318(0) can be designed to cause the master CPU 302(0) to verify, initialize, and/or test the system memory 324(0) connected to its respective CPU socket 302(0). Execution of the boot program code 318(1) can also be designed to cause the slave CPU 306(1) to verify, initialize, and/or test the system memory 324(1) connected to its respective CPU socket 302(1). The slave CPU 306(1) may be configured to report the verified and initialized system memory 324(1) connected to its CPU socket 302(1), and vice versa, so that each CPU 306(0), 306(1) can use this information to form a global memory map for the entire multi-socket computing system 300 to utilize the system memories 324(0), 324(1) as a global memory space.

Figure 5:
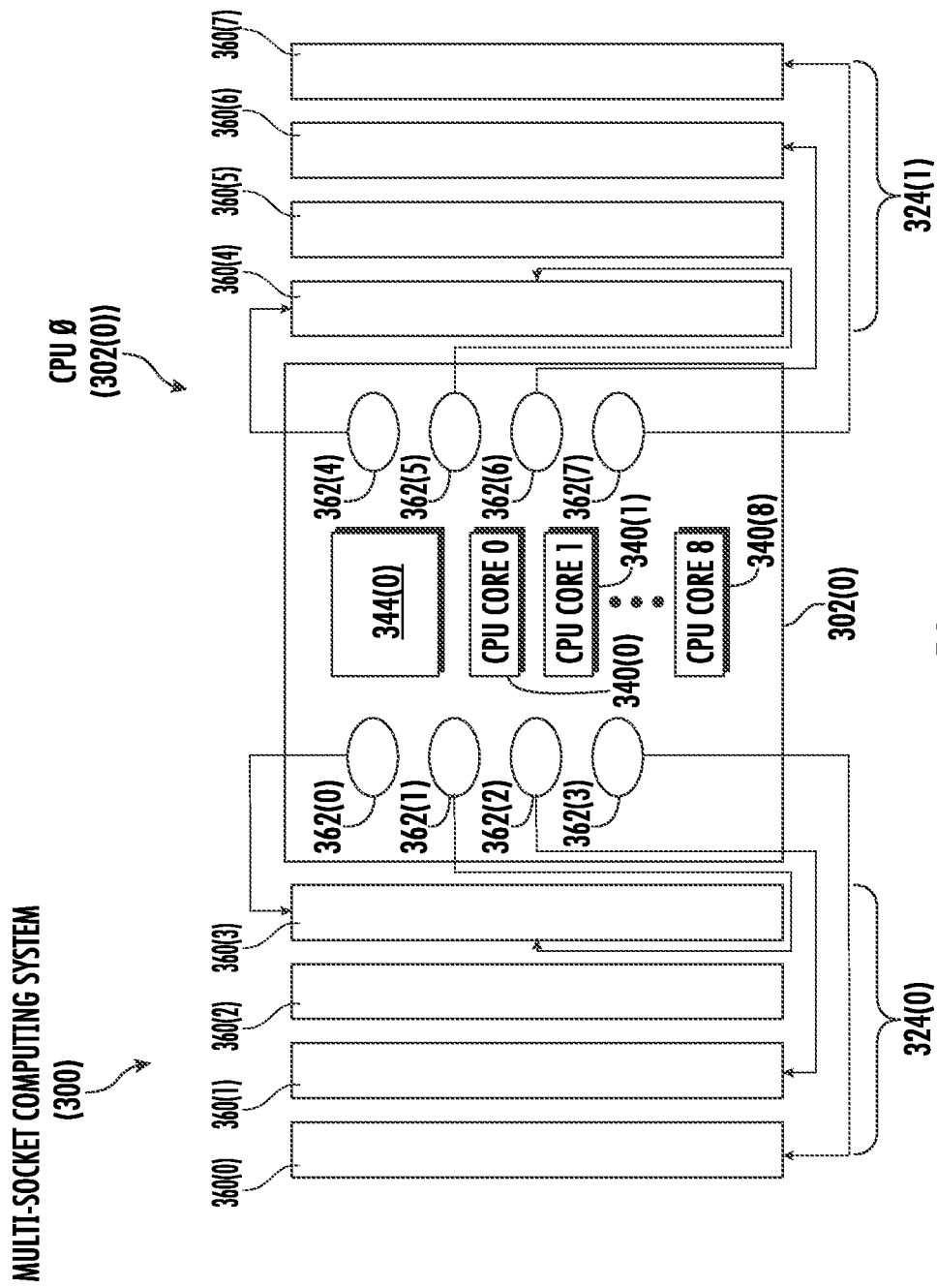
FIG. 5 is a block diagram of an exemplary system memory architecture in the multi-socket computing system in FIG. 3.

FIG. 5 is a block diagram of an exemplary system memory 324(0) that can be provided in the multi-socket computing system 300 in FIG. 3 to illustrate an example of a boot-up task to discovery, initialized, and/or test the system memory 324. Note that although only system memory 3240 connected to CPU socket 302(0) is shown in FIG. 5, the same architecture and discussion below for system memory 324(0) can also apply to system memory 324(1) connected to CPU socket 302(1) in FIGS. 3 and 4. In this example, as shown in FIG. 5, each CPU socket 302(0), 302(1) has connected system memory 324(0), 324(0).

With reference to FIG. 5, the system memory 324(0) in this example is provided as eight (8) memory chips 360(0)-360(7). For example, the memory chips 360(0)-360(7) could be DDR RAM memory chips. The CPU 306(0) could include dedicated memory controllers 362(0)-326(7) coupled to each respective memory chip 360(0)-360(7). In this manner, the memory chips 360(0)-360(7) can be discovered and accessed in parallel with each other as opposed to, for example, a single memory controller providing access to all of the memory chips 360(0)-360(7). As part of the application boot-up operation, the CPU core 0 340(0) executing an operating system loaded as part of the CPU boot-up operation could then cause the CPU cores 0-7 340(0)-340(7) for example, to access the respective memory controllers 362(0)-326(7) in parallel, to discover the connected memory chips 360(0)-360(7). The CPU core 0 304(0) could then develop a memory map of the available memory connected to the CPU 306(0) through CPU socket 302(1). The CPU cores 0-7 340(0)-340(7) could also test the memory chips 360(0)-360(7) by writing and reading data patterns to the memory chips 360(0)-360(7). The CPU core 0 340(0) could communicate the memory map of discovered memory chips 360(0)-360(7) through the high speed sideband communication channel 350 to the CPU 306(1). Similarly, the CPU 306(1) could communicate the memory map of its connected discovered memory chips in its connected system memory 324(0) through the high speed sideband communication channel 350 to the CPU 306(0). In this manner, both CPUs 306(0), 306(1) could develop an overall memory map of the available system memories 324(0), 324(1) in the multi-socket computing system 300 to provide an overall system memory 324 for the multi-socket computing system 300.

FIG. 6 illustrates an example of a processor-based system 600 that can include a multi-socket computing system 602, that can be the same or similar to the multi-socket computing systems 100, 300 in FIGS. 1 and 3 as examples. The multi-socket computing system 602 can be designed and configured to perform partially concurrent CPU boot-up operations between a first CPU 604(1) in a master CPU socket 606(1) and a second CPU 604(2) in a slave CPU socket 606(2). In this example, the multi-socket computing system 602 includes a processor 608 that includes the CPUs 604(0), 604(1). The CPU(s) 606(0), 606(1) may have coupled ache memory 610 for rapid access to temporarily stored data. The CPU(s) 606(0), 606(1) is coupled to a system bus 612 and can intercouple master and slave devices included in the processor-based system 600. As is well known, the CPU(s) 606(0), 606(1) communicates with these other devices by exchanging address, control, and data information over the system bus 612. For example, the CPU(s) 606(0), 606(1) can communicate bus transaction requests to a memory controller 614 as an example of a slave device. Although not illustrated in FIG. 6, multiple system buses 612 could be provided, wherein each system bus 612 constitutes a different fabric.

Other master and slave devices can be connected to the system bus 612. As illustrated in FIG. 6, these devices can include a memory system 616, one or more input devices 618, one or more output devices 620, one or more network interface devices 622, and one or more display controllers 628, as examples. The input device(s) 618 can include any type of input device, including, but not limited to, input keys, switches, voice processors, etc. The output device(s) 620 can include any type of output device, including, but not limited to, audio, video, other visual indicators, etc. The network interface device(s) 622 can be any devices configured to allow exchange of data to and from a network 624. The network 624 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 622 can be configured to support any type of communications protocol desired. The memory system 616 can include the memory controller 614 coupled to one or more memory arrays 626.

The CPU(s) 606(0), 606(1) may also be configured to access the display controller(s) 628 over the system bus 612 to control information sent to one or more displays 630. The display controller(s) 628 sends information to the display(s) 630 to be displayed via one or more video processors 632, which process the information to be displayed into a format suitable for the display(s) 630. The display(s) 630 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A multi-socket computing system, comprising:
   a system memory, comprising:
      a first memory comprising at least one first memory chip; and
      a second memory comprising at least one second memory chip;
   a master central processing unit (CPU) socket;
   a slave CPU socket;
   a first CPU chip disposed in the master CPU socket, the first CPU chip comprising a first CPU comprising a plurality of first CPU cores;
   a second CPU chip disposed in the slave CPU socket, the second CPU chip comprising a second CPU comprising a plurality of second CPU cores;
   a side band communication link coupled between the master CPU socket and the slave CPU socket;
   the first CPU configured to:
      receive a master reset signal indicating at boot-up state; and
      in response to the master reset signal indicating the boot-up state, execute first boot program code to perform a first CPU boot-up operation to:
         set up a sideband communication channel on the sideband communication link;
         communicate a slave boot-up synchronization signal indicating the boot-up state on the sideband communication channel; and
         perform one or more first CPU boot-up tasks comprising a first CPU core of the plurality of first CPU cores initializing a respective first memory chip among the at least one first memory chip;
   the second CPU configured to, in response to the slave boot-up synchronization signal indicating the boot-up state:
      execute second boot program code to perform a second CPU boot-up operation comprising one or more second CPU boot-up tasks partially concurrent with the performance of the first CPU boot-up operation, comprising a second CPU core of the plurality of second CPU cores initializing a respective second memory chip among the at least one second memory chip.

2. The multi-socket computing system of claim 1, further comprising a reset port configured to receive the master reset signal;
wherein:
the master boot processor is coupled to the reset port; and
the slave boot processor is coupled to the reset port;
the slave boot processor configured to, in response to the master reset signal indicating the boot-up state and the slave boot-up synchronization signal indicating the boot-up state:
execute the second boot program code to initiate the second CPU boot-up operation to perform the one or more second CPU boot-up tasks partially concurrent with the performance of the first CPU boot-up operation.

3. The multi-socket computing system of claim 1, further comprising a program code memory comprising a boot program code;
the first CPU further configured to, in response to the master reset signal indicating the boot-up state, load the boot program code from the program code memory as the first boot program code; and
the second CPU further configured to, in response to the slave boot-up synchronization signal indicating the boot-up state, load the boot program code from the program code memory as the second boot program code.

4. The multi-socket computing system of claim 3, wherein the first CPU is further configured to, in response to the master reset signal indicating the boot-up state:
determine when the boot program code is fully loaded from the program code memory as the first boot program code; and
in response to determining the boot program code is fully loaded from the program code memory as the first boot program code:
communicate the slave boot-up synchronization signal indicating the boot-up state on the sideband communication channel to the second CPU.

5. The multi-socket computing system of claim 1, wherein:
the second CPU is configured to perform the second CPU boot-up operation by being further configured to communicate a second CPU identification on the sideband communication channel;
the first CPU is configured to perform the first CPU boot-up operation by being further configured to:
receive the second CPU identification on the sideband communication channel; and
determine if the second CPU is valid based on the authentication the second CPU.

6. The multi-socket computing system of claim 5, wherein the first CPU is further configured to, in response to determining the second CPU is not valid, perform the one or more first CPU boot-up tasks in a standalone mode.

7. The multi-socket computing system of claim 5, wherein the first CPU is further configured to, in response to determining the second CPU is not valid, discontinue performance of the one or more first CPU boot-up tasks.

8. The multi-socket computing system of claim 5, wherein the first CPU is further configured to, in response to determining the second CPU is valid, continue performance of the one or more first CPU boot-up tasks.

9. The multi-socket computing system of claim 5, wherein the first CPU is configured to perform the first CPU boot-up operation by being further configured to:
determine if the second CPU identification on the sideband communication channel has not been received without a predetermined authentication time; and
in response to the second CPU identification not being received within the predetermined authentication time, identify the slave CPU socket as not authentic.

10. The multi-socket computing system of claim 1, wherein:
the first CPU is configured to perform the one or more first CPU boot-up tasks by being configured to initiate a first power initialization boot-up task in the first CPU; and
the second CPU is configured to perform the one or more second CPU boot-up tasks by being configured to initiate a second power initialization boot-up task in the first CPU.

11. The multi-socket computing system of claim 1, wherein the first CPU is configured to perform the one or more first CPU boot-up tasks by being configured to set up a high-speed sideband communication channel on the sideband communication link having a bandwidth greater than the sideband communication channel.

12. The multi-socket computing system of claim 1, wherein:
the first CPU comprises a first boot processor and a first application processor configured to execute a first application program code;
the second CPU comprises a second boot processor and a second application processor configured to execute a second application program code;
the first boot processor configured to:
receive the master reset signal indicating at boot-up state; and
in response to the master reset signal indicating the boot-up state, execute the first boot program code to perform the first CPU boot-up operation comprising a first hardware boot-up operation in the first CPU to:
perform the one or more first CPU boot-up tasks;
set up the sideband communication channel on the sideband communication link; and
communicate the slave boot-up synchronization signal indicating the boot-up state on the sideband communication channel; and
the second CPU configured to, in response to the slave boot-up synchronization signal indicating the boot-up state:
execute the second boot program code to perform the second CPU boot-up operation comprising a second hardware boot-up operation in the second CPU partially concurrent with the performance of the first hardware GPU boot-up operation in the first CPU.

13. The multi-socket computing system of claim 12, wherein:
the first application processor is further configured to execute a first application boot-up program code to perform a first application boot-up operation in the first CPU; and
the second application processor is further configured to execute a second application boot-up program code to perform a second application boot-up operation in the second CPU; and
the first boot processor is further configured to perform the first hardware boot-up operation, by being configured to:

initiate execution of the first application boot-up operation in the first application processor; and initiate execution of the second application boot-up operation in the second application processor.

14. The multi-socket computing system of claim 13, wherein the second application processor is configured to execute the second application boot-up program code to perform the second application boot-up operation in the second CPU partially concurrently with the execution of the first application boot-up program code in the first CPU.

15. The multi-socket computing system of claim 14, further comprising:

a first system memory connected to the master CPU socket; and a second system memory connected to the slave CPU socket;

wherein;

the first CPU is configured to perform the first application boot-up operation by being configured to initiate a memory initialization operation to the first system memory; and the second CPU is configured to perform the second application boot-up operation by being configured to initiate a memory initialization operation to the second system memory.

16. The multi-socket computing system of claim 13, wherein the first CPU is configured to perform the first application boot-up operation by being configured to initiate a memory initialization operation to the first system memory.

17. The multi-socket computing system of claim 1, wherein:

the first memory is connected to the master CPU socket; and the second memory is connected to the master CPU socket.

18. The multi-socket computing system of claim 1, wherein:

the first CPU is further configured to determine a memory map for the system memory based on the initialization of the at least one first memory chip and the at least one second memory chip; and the second CPU is further configured to determine the memory map for the system memory based on the initialization of the at least one first memory chip and the at least one second memory chip.

19. The multi-socket computing system of claim 1, further comprising:

a second slave CPU socket; and a third CPU chip disposed in the second slave CPU socket, the third CPU chip comprising a third CPU; and wherein:

the side band communication link is further coupled between the master CPU socket and the second slave CPU socket;

the third CPU is configured to, in response to the slave boot-up synchronization signal indicating the boot-up state:

execute third boot program code to perform a third CPU boot-up operation comprising one or more third CPU boot-up tasks on the third CPU partially concurrent with the performance of the first CPU boot-up operation on the first CPU.

20. The multi-socket computing system of claim 1, wherein:

the first memory is connected to the master CPU socket; and the second memory is connected to the slave CPU socket.

21. A method of performing partially concurrent processor boot operations in a multi-socket computing system, comprising:

receiving a master reset signal indicating at boot-up state in a first central processing unit (CPU) comprising a plurality of first CPU cores in a first CPU chip disposed in a master CPU socket; and in response to the master reset signal indicating the boot-up state, execute first boot program code in the first CPU to perform a first CPU boot-up operation to:

setting up a sideband communication channel on the sideband communication link coupled between the master CPU socket and a slave CPU socket;

communicating a slave boot-up synchronization signal indicating the boot-up state on the sideband communication channel; and performing one or more first CPU boot-up tasks comprising a first CPU core of the plurality of first CPU cores initializing a respective first memory chip of at least one first memory chip in a first memory in a system memory;

in response to the slave boot-up synchronization signal indicating the boot-up state in a second CPU comprising a plurality of second CPU cores in a second CPU chip disposed in the slave CPU socket:

executing a second boot program code in the second CPU to perform a second CPU boot-up operation comprising one or more second CPU boot-up tasks partially concurrent with the performance of the first CPU boot-up operation comprising a second CPU core of the plurality of second CPU cores initializing a respective second memory chip of at least one second memory chip in a second memory in the system memory.

22. The method of claim 21, further comprising:

in response to the master reset signal indicating the boot-up state, loading the boot program code from a program code memory as the first boot program code into the first CPU; and the second CPU further configured to, in response to the slave boot-up synchronization signal indicating the boot-up state, loading the boot program code from the program code memory as the second boot program code into the second CPU.

23. The method of claim 22, further comprising, in response to the master reset signal indicating the boot-up state:

determining when the boot program code is fully loaded from the program code memory as the first boot program code; and in response to determining the boot program code is fully loaded from the program code memory as the first boot program code:

communicating the slave boot-up synchronization signal indicating the boot-up state on the sideband communication channel to the second CPU.

24. The method of claim 23, wherein:

performing the second CPU boot-up operation further comprises communicating a second CPU identification on the sideband communication channel;

performing the first CPU boot-up operation further comprises:
  receiving the second CPU identification on the sideband communication channel; and
  determining if the second CPU is valid based on the authentication the second CPU.

25. A non-transitory computer-readable medium having stored thereon computer executable instructions which, when executed by a processor, cause the processor to:
  receive a master reset signal indicating at boot-up state in a first central processing unit (CPU) comprising a plurality of first CPU cores in a first CPU chip disposed in a master CPU socket; and
  in response to the master reset signal indicating the boot-up state, execute first boot program code in the first CPU to perform a first CPU boot-up operation to:
    set up a sideband communication channel on the sideband communication link coupled between the master CPU socket and a slave CPU socket;
    communicate a slave boot-up synchronization signal indicating the boot-up state on the sideband communication channel; and
    perform one or more first CPU boot-up tasks comprising a first CPU core of the plurality of first CPU cores initializing a respective first memory chip of at least one first memory chip in a first memory in a system memory;
  in response to the slave boot-up synchronization signal indicating the boot-up state in a second CPU comprising a plurality of second CPU cores in a second CPU chip disposed in the slave CPU socket:
    execute a second boot program code in the second CPU to perform a second CPU boot-up operation comprising one or more second CPU boot-up tasks partially concurrent with the performance of the first CPU boot-up operation comprising a second CPU core of the plurality of second CPU cores initializing a respective second memory chip of at least one second memory chip in a second memory in the system memory.

* * * * *